(12) United States Patent
Jang et al.

(10) Patent No.: US 10,249,872 B2
(45) Date of Patent: Apr. 2, 2019

(54) SILICON-CARBON COMPOSITE, NEGATIVE ELECTRODE COMPRISING SAME, SECONDARY BATTERY USING SILICON-CARBON COMPOSITE, AND METHOD FOR PREPARING SILICON-CARBON COMPOSITE

(71) Applicant: LG CHEM, LTD., Seoul (KR)

(72) Inventors: Minchul Jang, Daejeon (KR); Jeong Kyu Kim, Daejeon (KR); Yoo Seok Kim, Daejeon (KR); Suhwan Kim, Daejeon (KR); Jinhyoung Yoo, Daejeon (KR); Da Young Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 205 days.

(21) Appl. No.: 15/311,945

(22) PCT Filed: Jun. 10, 2015

(86) PCT No.: PCT/KR2015/005837
§ 371 (c)(1),
(2) Date: Nov. 17, 2016

(87) PCT Pub. No.: WO2015/190832
PCT Pub. Date: Dec. 17, 2015

(65) Prior Publication Data
US 2017/0092936 A1 Mar. 30, 2017

(30) Foreign Application Priority Data
Jun. 13, 2014 (KR) .......................... 10-2014-0072459

(51) Int. Cl.
*H01M 4/00* (2006.01)
*H01M 4/36* (2006.01)
(Continued)

(52) U.S. Cl.
CPC ........... *H01M 4/364* (2013.01); *H01M 4/386* (2013.01); *H01M 4/587* (2013.01); *H01M 4/62* (2013.01);
(Continued)

(58) Field of Classification Search
CPC ...... H01M 4/364; H01M 4/386; H01M 4/587; H01M 4/62; H01M 4/625; H01M 4/133
(Continued)

(56) References Cited

U.S. PATENT DOCUMENTS 8,679,679 B2 * 3/2014 Zhang ..................... H01B 1/16
252/182.1
9,917,299 B2 * 3/2018 Behan ..................... H01M 4/13
(Continued)

FOREIGN PATENT DOCUMENTS

CN 102456876 A 5/2012
JP 2002-93416 A 3/2002
(Continued)

OTHER PUBLICATIONS

Han et al., "Fabrication of superior-performance SnO2@C composites for lithium-ion anodes using tubular mesoporous carbon with thin carbon walls and high pore volume", Journal of Materials Chemistry, 2012, vol. 22, No. 19, pp. 9645-9651, see pp. 9647 and 9651, figure 1.
(Continued)

*Primary Examiner* — Amanda C. Walke
(74) *Attorney, Agent, or Firm* — Birch, Stewart, Kolasch & Birch, LLP

(57) ABSTRACT

The present specification relates to a silicon-carbon composite, a negative electrode including the same, a secondary battery using the silicon-carbon composite, and a method for preparing the silicon-carbon composite.

19 Claims, 4 Drawing Sheets

(51) Int. Cl.
  H01M 4/62    (2006.01)
  H01M 4/587   (2010.01)
  H01M 4/38    (2006.01)
  H01M 4/02    (2006.01)
  C01B 32/168  (2017.01)
(52) U.S. Cl.
  CPC ..... C01B 32/168 (2017.08); H01M 2004/027 (2013.01); H01M 2220/30 (2013.01)
(58) Field of Classification Search
  USPC ..................................................... 429/231.8
  See application file for complete search history.

(56)  References Cited

U.S. PATENT DOCUMENTS

| | | |
|---|---|---|
| 2007/0224508 A1 | 9/2007 | Aramata et al. |
| 2011/0302169 A1 | 12/2011 | Brdiczka et al. |
| 2012/0094181 A1 | 4/2012 | Kim et al. |
| 2013/0337365 A1* | 12/2013 | Pak ................... H01M 4/9083 429/482 |
| 2014/0080000 A1 | 3/2014 | Han et al. |

FOREIGN PATENT DOCUMENTS

| | | |
|---|---|---|
| JP | 2012-033474 A | 2/2012 |
| KR | 10-2007-0096933 A | 10/2007 |
| KR | 10-2010-0136073 A | 12/2010 |
| KR | 10-2011-0052595 A | 5/2011 |
| KR | 10-2012-0130709 A | 12/2012 |

OTHER PUBLICATIONS

International Search Report, issued in PCT/KR2015/005837 (PCT/ISA/210), dated Aug. 25, 2015.
Korean Office Action for application No. 10-2015-0082070 dated May 3, 2016.
Park et al., "One-pot synthesis of silicon nanoparticles trapped in ordered mesoporous carbon for use as an anode material in lithium-ion batteries", Nanotechnology, 2013, vol. 24, No. 2, 025602, pp. 1-7, See abstract, pp. 2-3, scheme1.
Wang et al., "Highly Reversible Lithium Storage in Porous SnO2 Nanotubes with Coaxially Grown Carbon Nanotube Ovenayers", Advanced Materials, 2006, vol. 18, iss. 5, pp. 645-649.
Wang et al., "Synthesis of monolithic 3D ordered macroporous carbon/nano-silicon composites by diiodosilane decomposition", Carbon 2008, vol. 46, No. 13, pp. 1702-1710, See abstract, pp. 1704-1705 and 1709, figure 3.
European Search Report for Appl. No. 15807289.2 dated Nov. 28, 2017.
Lei, Z., et al., "CMK-5 Mesoporous Carbon Synthesized via Chemical Deposition of Ferrocene as Catalyst Support for Methanol Oxidation," J. Phys. Chem. C., Jan. 2008, vol. 112, No. 3, pp. 722-731.
Sun, X., et al, "The synthesis of porous materials with macroscopically oriented mesopores interconnected by branched mesopores—Journal of Materials Chemistry A (RSC Publishing)," Journal of Materials Chemistry A: Materials for Energy and Sustainability, Mar. 2013, pp. 4693-4698.
Tian, B., et al, "Novel approaches to synthesize self-supported ultrathin carbon nanowire arrays templated by MCM-41 Electronic supplementary information (ESI)," Chem. Commun., Jan. 2003, No. 21, pp. 2726-2727.
Xing, Y., et al, "Facile fabrication of mesoporous carbon nanofibers with unique hierarchical nanoarchitecture for electrochemical hydrogen storage," International Journal of Hydrogen Energy, Apr. 2014, vol. 39. No. 15, pp. 7859-7867.
Xue, C., et al,"Silicate-1 monolith with vertically aligned mesopores templated from carbon nanotube array," Materials Letters, Apr. 2015, vol. 154, pp. 55-59.
Takashi Kawase et al., "Cathodes comprising Li2MnSiO4 nanoparticles dispersed in the mesoporous carbon frameworks, CMK-3 and CMK-8", Microporous and Mesoporous Materials, 155, 2012, pp. 99-105.

* cited by examiner

[Figure 1]
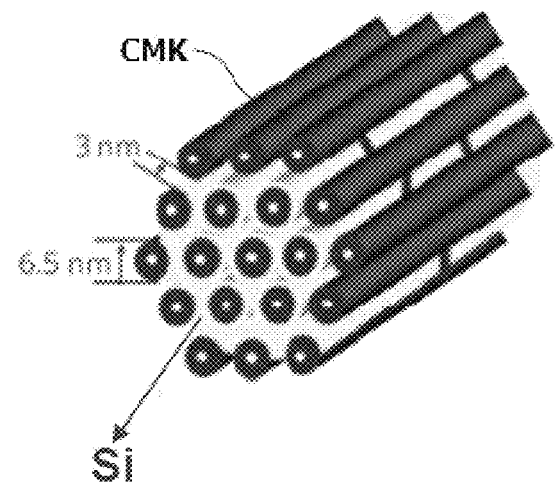
[Figure 2]
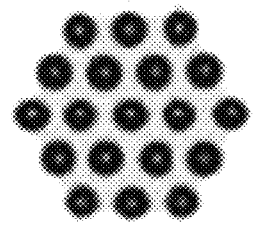
CMK-3/Si

[Figure 3]
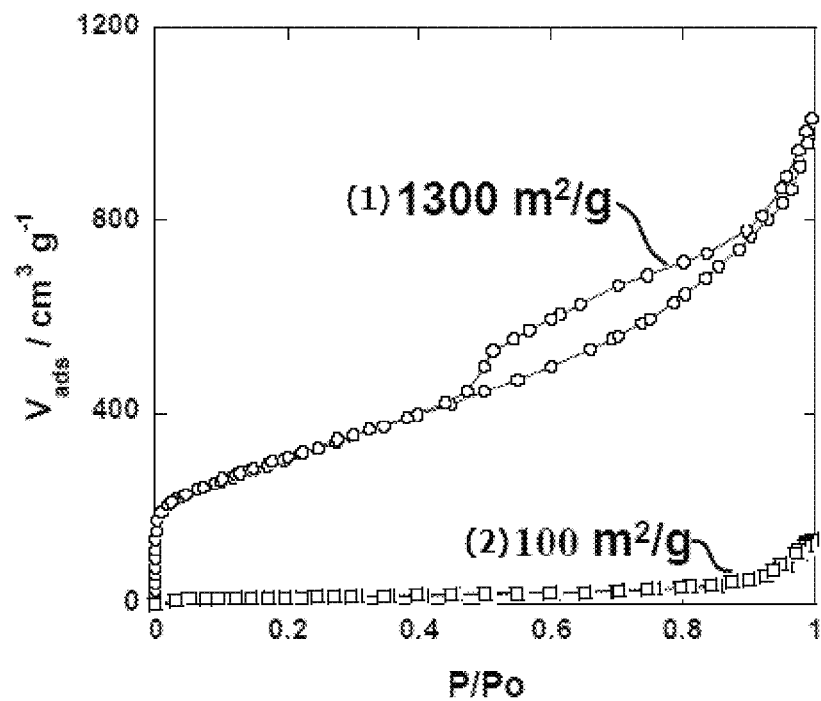

[Figure 4]
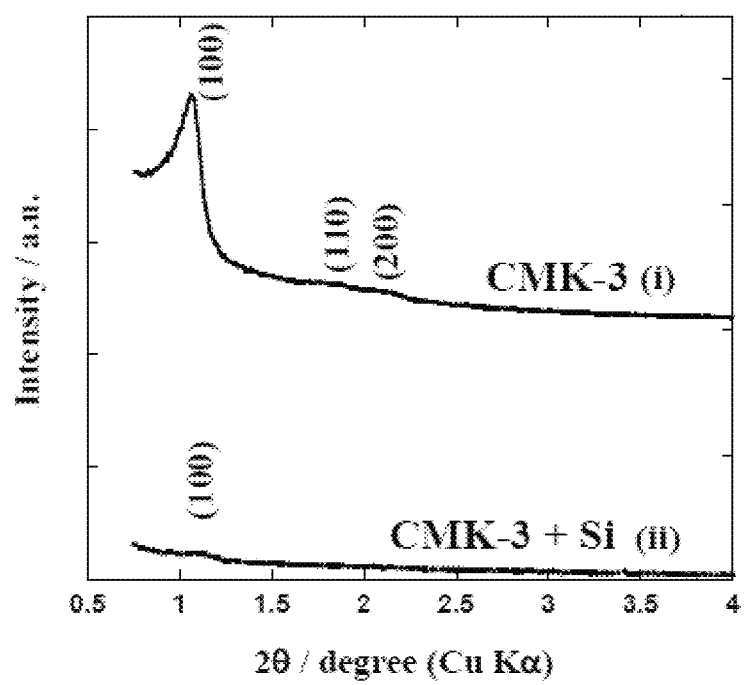

[Figure 5]
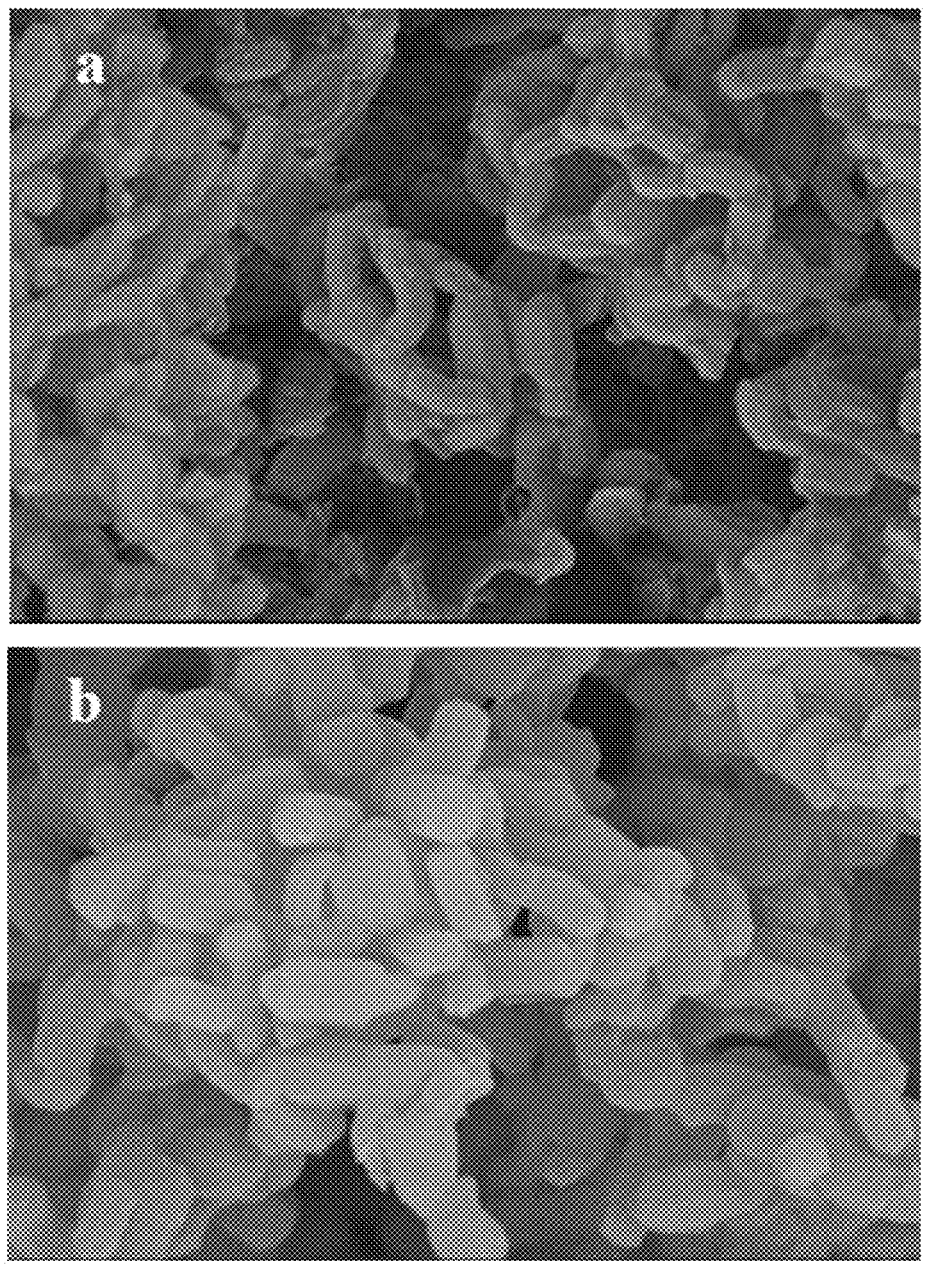

SILICON-CARBON COMPOSITE, NEGATIVE ELECTRODE COMPRISING SAME, SECONDARY BATTERY USING SILICON-CARBON COMPOSITE, AND METHOD FOR PREPARING SILICON-CARBON COMPOSITE

TECHNICAL FIELD

This application claims priority to and the benefits of Korean Patent Application No. 10-2014-0072459, filed with the Korean Intellectual Property Office on Jun. 13, 2014, the entire contents of which are incorporated herein by reference.

The present disclosure relates to a silicon-carbon composite, a negative electrode including the same, a secondary battery using the silicon-carbon composite, and a method for preparing the silicon-carbon composite.

BACKGROUND ART

With a recent trend of miniaturization and weight lightening of electronic devices, miniaturization and weight lightening of batteries used therein as a power supply have been also required. Secondary batteries are commercialized as batteries that are small, light, and chargeable and dischargeable with high capacity, and used in portable electronic devices such as small video cameras, mobile phones and laptops, communication devices and the like.

Secondary batteries are an energy storage system having high energy and power, and have excellent advantages of having higher capacity or operating voltage compared to other batteries. However, battery safety becomes a problem due to such high energy, and there is a risk of explosion or fire. Particularly, in hybrid vehicles and the like recently receiving an attention, high energy and output properties are required and accordingly, such safety is more important.

A secondary battery is generally formed with a positive electrode, a negative electrode and an electrolyte, and charge and discharge become possible since metal ions perform a role of transferring energy while travelling back and forth between both electrodes. Metal ions come out of a positive electrode active material by first charge, are inserted into a negative electrode active material, that is, carbon particles, and eliminated from carbon particles again during discharge.

Meanwhile, with the development of portable electronic devices, high capacity batteries have been continuously required, and researches on high capacity negative electrode materials having significantly higher capacity per unit weight compared to carbon used as an existing negative electrode material have been actively conducted.

DISCLOSURE

Technical Problem

The present specification is directed to providing a silicon-carbon composite, a negative electrode including the same, a secondary battery using the silicon-carbon composite, and a method for preparing the silicon-carbon composite.

Technical Solution

One embodiment of the present specification provides a silicon-carbon composite including a carbon assembly having a plurality of carbon nanowires or carbon nanotubes assembled, and having mesopores perforated in a length direction between a plurality of the carbon nanowires or the carbon nanotubes; and a silicon-based material provided in the mesopores of the carbon assembly.

Another embodiment of the present specification provides a negative electrode including the silicon-carbon composite.

Still another embodiment of the present specification provides a secondary battery using the silicon-carbon composite.

Yet another embodiment of the present specification provides a battery module including the secondary battery as a unit battery.

Still yet another embodiment of the present specification provides a method for preparing a silicon-carbon composite including penetrating a silicon-based compound into mesopores of a carbon assembly having the mesopores perforated in a length direction between a plurality of carbon nanowires or carbon nanotubes by assembling a plurality of the carbon nanowires or the carbon nanotubes.

Advantageous Effects

In one embodiment of the present specification, a nanosized Si—C composite can be readily synthesized by penetrating a silicon-based material into mesopores of a carbon assembly.

In one embodiment of the present specification, the silicon-based material provided in the mesopores of the carbon assembly can suppress silicon volume expansion since the silicon-based material is subject to spatial restriction by the mesopores of the carbon assembly.

In one embodiment of the present specification, the silicon-based material provided in the mesopores of the carbon assembly can increase initial charge/discharge efficiency by minimizing the amount of lithium consumed in solid electrolyte interphase (SEI) formation since the silicon-based material is subject to spatial restriction by the mesopores of the carbon assembly.

In one embodiment of the present specification, the silicon-based material provided in the mesopores of the carbon assembly has an advantage in that the particle-type silicon-based material is not readily broken during charge/discharge since the silicon-based material is subject to spatial restriction by the mesopores of the carbon assembly, and a side reaction consuming lithium for additional solid electrolyte interphase (SEI) formation is reduced.

DESCRIPTION OF DRAWINGS

FIG. 1 is a perspective view of a silicon-carbon composite according to one embodiment of the present specification.

FIG. 2 is a sectional view of a silicon-carbon composite according to one embodiment of the present specification.

FIG. 3 is a graph showing results of measuring a specific surface area of CMK-3 (carbon mesostructured by KAIST-3) before and after Siimmersion in Example 1.

FIG. 4 is a graph showing results of measuring CMK-3 before and after Si immersion in Example 1 using a low angle x-ray diffractometer (XRD).

FIG. 5 is an image showing results of measuring CMK-3 before and after Si immersion in Example 1 using a scanning electron microscope.

MODE FOR DISCLOSURE

Hereinafter, the present specification will be described in detail.

The present specification provides a silicon-carbon composite including a carbon assembly having a plurality of carbon nanowires or carbon nanotubes assembled, and having mesopores perforated in a length direction between a plurality of the carbon nanowires or the carbon nanotubes; and a silicon-based material provided in the mesopores of the carbon assembly.

The carbon assembly is particles formed from the assembly of a plurality of carbon nanowires or carbon nanotubes, and a plurality of the carbon nanowires or the carbon nanotubes in one particle bind to neighboring carbon nanowires or carbon nanotubes, and thereby have power capable of maintaining a size of the mesopores perforated in a length direction between a plurality of the carbon nanowires or the carbon nanotubes.

The carbon assembly is obtained by a plurality of the carbon nanowires or the carbon nanotubes being uniformly distributed in a hexagonal form and assembled. Specifically, in the carbon assembly, a vertical section in a carbon assembly length direction is hexagon by a plurality of the carbon nanowires or the carbon nanotubes being assembled as in FIG. 1 and FIG. 2, and the form of the vertical section in a length direction of the carbon assembly means a shape formed by the carbon nanowires or the carbon nanotubes located in the outermost place.

As the number of the carbon nanowires or the carbon nanotubes increases in one carbon assembly, a diameter of the carbon assembly, the number of the mesopores, and the like, increase.

The carbon nanowires may be a column in which a diameter of the vertical section in a length direction is a nano-sized unit, and an inside thereof is all formed with carbon. The carbon nanotubes may be a tube in which a diameter of the vertical section in a length direction is a nano-sized unit and an inside thereof is empty.

A diameter of the mesopores of the carbon assembly may be nano-sized, and specifically, 100 nm or less. This has an advantage in that stress resistance caused by silicon volume expansion is high, and a high output property of a battery is also enhanced.

A diameter of the mesopores of the carbon assembly may be greater than or equal to 1 nm and less than or equal to 100 nm and specifically, a diameter of the mesopores of the carbon assembly may be greater than or equal to 1 nm and less than or equal to 20 nm.

A specific surface area of the carbon assembly may be 90 $m^2/g$ or higher. This has an advantage in that loading of the silicon-based material into the carbon pores may increase.

Herein, the specific surface area of the carbon assembly means an area ($m^2$) of the carbon assembly capable of being in contact with other materials.

The carbon assembly may include at least one of CMK-3 (carbon mesostructured by KAIST-3) and CMK-5 (carbon mesostructured by KAIST-5).

The carbon assembly may be carbon assembly particles.

Diameter of the carbon assembly particles may be greater than or equal to 0.1 μm and less than or equal to 10 μm. Herein, a diameter of the carbon assembly particle means a length of the longest line passing a center of gravity of a vertical section in a length direction of the carbon assembly.

The silicon-based material is not limited as long as it includes a silicon element, but may be silicon-based particles provided through penetration into the mesopores of the carbon assembly. Herein, the silicon-based particles mean particles including a silicon element.

The silicon-based material may include at least one of silane-based compounds, silicon and lithiated silicon.

The silane-based compound means a hydrogenated silicon compound, and also includes compounds in which any one or more of the hydrogens in the hydrogenated silicon are substituted with halogen. For example, the silane-based compound may be a silane compound or a halogenated silane compound, and specifically, a silane compound or a trichlorosilane compound. In addition, the lithiated silicon means a composite compound of lithium-silicon, and for example, the lithiated silicon compound may be a compound represented by $Li_{22}Si_5$.

Diameters of the silicon-based particles provided in the mesopores of the carbon assembly may correspond to diameters of the mesopores of the carbon assembly. Diameters of the silicon-based particles provided in the mesopores of the carbon assembly have positive correlation with diameters of the mesopores of the carbon assembly. Specifically, a relationship, in which diameters of the silicon-based particles provided in the mesopores of the carbon assembly increase as diameters of the mesopores of the carbon assembly increase, may be formed.

Diameters of the silicon-based particles provided in the mesopores of the carbon assembly may be the same as diameters of the mesopores of the carbon assembly, or larger than diameters of the mesopores of the carbon assembly.

In one embodiment of the present specification, when a sum of a mass of the carbon assembly is employed as 100, a mass ratio of the carbon assembly and the silicon-based material may be from 1:1 to 1:5. This has an advantage in that stress resistance with respect to volume expansion of the silicon-based material increases.

In one embodiment of the present specification, a porosity decrease ratio caused by the occupation of the silicon-based material in the total porosity of the carbon assembly may be greater than or equal to 20% and less than or equal to 95% based on the total porosity of the carbon assembly. This has an advantage in that stress resistance with respect to volume expansion of the silicon-based material increases.

In one embodiment of the present specification, a nano-sized Si—C composite may be readily synthesized by penetrating the silicon-based material into the mesopores of the carbon assembly.

In one embodiment of the present specification, the silicon-based material provided in the mesopores of the carbon assembly may suppress silicon volume expansion since the silicon-based material is subject to spatial restriction by the mesopores of the carbon assembly.

In one embodiment of the present specification, the silicon-based material provided in the mesopores of the carbon assembly may increase initial charge/discharge efficiency by minimizing the amount of lithium consumed in solid electrolyte interphase (SEI) formation since the silicon-based material is subject to spatial restriction by the mesopores of the carbon assembly.

Generally, when silicon is not subject to spatial restriction, particles broken due to volume expansion make a new surface, and lithium is consumed while an additional solid electrolyte interface is formed on the newly made surface, which inhibits smooth charge and discharge cycles.

In one embodiment of the present specification, the silicon-based material provided in the mesopores of the carbon assembly has an advantage in that the particle-type silicon-based material is not readily broken during charge/discharge since the silicon-based material is subject to spatial restriction by the mesopores of the carbon assembly, and a side reaction consuming lithium for additional solid electrolyte interphase (SEI) formation is reduced.

The present specification provides an electrode including the silicon-carbon composite. Specifically, the present specification provides a negative electrode including the silicon-carbon composite.

The present specification provides a secondary battery using the silicon-carbon composite.

The secondary battery may include a negative electrode including the silicon-carbon composite of the present specification. Specifically, the secondary battery may include a positive electrode; a negative electrode; and a separator provided between the positive electrode and the negative electrode, wherein the negative electrode includes the silicon-carbon composite.

The secondary battery may further include a positive electrode-side positive electrode liquid electrolyte and a negative electrode-side negative electrode liquid electrolyte divided by the separator.

The positive electrode liquid electrolyte and the negative electrode liquid electrolyte may include a solvent and an electrolytic salt. The positive electrode liquid electrolyte and the negative electrode liquid electrolyte may include solvents that are the same as or different from each other.

The liquid electrolyte may be an aqueous liquid electrolyte or a non-aqueous liquid electrolyte, and the aqueous liquid electrolyte may include water. The non-aqueous liquid electrolyte may include a non-aqueous organic solvent selected from the group consisting of carbonate-based solvents, ester-based solvents, ether-based solvents, ketone-based solvents, organosulfur-based solvents, organophosphorous-based solvents, nonprotonic solvents and combinations thereof.

The non-aqueous organic solvent may be selected from the group consisting of ethylene carbonate (EC), propylene carbonate (PC), butylene carbonate (BC), dimethyl carbonate (DMC), diethyl carbonate (DEC), dipropyl carbonate (DPC), dibutyl carbonate (DBC), ethyl methyl carbonate (EMC), methyl propyl carbonate (MPC), ethyl propyl carbonate (EPC), fluoroethylene carbonate (FEC), dibutyl ether, tetraglyme, diglyme, dimethoxyethane, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, polyethylene glycol dimethyl ether (PEGDME) and combinations thereof.

The electrolytic salt refers to those dissociated into cations and anions in water or non-aqueous organic solvents.

A concentration of the electrolytic salt is not particularly limited in the liquid electrolyte. For example, the concentration may be 1 M, and in this case, charge and discharge properties of a secondary battery may be effectively exhibited.

The separator provided between the positive electrode and the negative electrode separates or insulates the positive electrode and the negative electrode, and any material may be used as long as it allows ion transport between the positive electrode and the negative electrode. Examples thereof may include porous non-conducting or insulating materials. More specifically, polymer non-woven fabric such as non-woven fabric made of polypropylene materials or non-woven fabric made of polyphenylene sulfide materials; or porous films of olefin-based resins such as polyethylene or polypropylene may be included as examples, and these may be used as a combination of two or more types. Such a separator may be an independent member such as a film, or may be a coating layer added to the positive electrode and/or the negative electrode. The separator is for penetrating the electrolyte, and may be used as a support of the electrolyte.

A shape of the secondary battery is not limited, and examples thereof may include a coin-type, a plate-type, a cylinder-type, a horn-type, a button-type, a sheet-type or a layered-type.

The secondary battery is not particularly limited as long as it is provided with a negative electrode including the silicon-carbon composite of the present disclosure.

For example, the secondary battery may be a lithium secondary battery. Examples of the lithium secondary battery may include a lithium sulfur battery or a lithium air battery. Specifically, the positive electrode of the secondary battery may be an air electrode.

The present specification provides a battery module including the secondary battery as a unit battery.

The battery module may be formed by inserting bipolar plates between the secondary batteries according to one embodiment of the present specification and stacking the result.

When the lithium secondary battery is a lithium air battery, the bipolar plate may be porous so as to supply air supplied from the outside to the positive electrode included in each lithium air battery. Examples thereof may include porous stainless steel or porous ceramic.

Specifically, the battery module may be used as a power supply of electric vehicles, hybrid electric vehicles, plug-in hybrid electric vehicles or power storage systems.

The present specification provides a method for preparing a silicon-carbon composite including the step of penetrating a silicon-based compound into mesopores of a carbon assembly.

Specifically, by penetrating a silicon-based compound into mesopores of a carbon assembly, silicon-based particles may be formed by the silicon-based compound penetrating into the mesopores of the carbon assembly. Herein, the silicon-based compound and the silicon-based particles mean a compound and particles including a silicon element, respectively.

Herein, descriptions on the carbon assembly and the silicon-based particles may use the definitions provided above.

The silicon-based compound penetrating into the mesopores of the carbon assembly may include at least one of silane-based compounds, silicon and lithiated silicon. Herein, the silicon-based compound penetrating into the mesopores of the carbon assembly may penetrate into the mesopores of the carbon assembly as a compound itself that is at least one of silane-based compounds, silicon and lithiated silicon itself, or the silicon-based compound penetrating into the mesopores of the carbon assembly chemically changes into a compound that is at least one of silane-based compounds, silicon and lithiated silicon.

The penetrating a silicon-based compound into mesopores of a carbon assembly may include penetrating a silane-based compound into the mesopores of the carbon assembly. For example, the penetrating silane or trichlorosilane into the mesopores of the carbon assembly may be included.

Heat treating the carbon assembly into which the silicon-based compound penetrates may be further included. By the heat treatment, the silane-based compound penetrating into the carbon assembly may be changed into silicon.

Herein, the heat treatment temperature is not particularly limited as long as it is a temperature at which the silane-based compound penetrating into the carbon assembly may be changed into silicon, and specifically, the temperature may be greater than or equal to 150° C. and less than or equal to 300° C.

Reacting the silicon-based compound penetrating into the heat treated carbon assembly with lithium metal or iodized lithium may be further included. Specifically, the silicon penetrating into the heat treated carbon assembly may be reacted with lithium metal or iodized lithium.

The step of penetrating a silicon-based compound into mesopores of a carbon assembly is penetrating a silane-based compound into the mesopores of the carbon assembly, and the method for preparing a silicon-carbon composite may further include heat treating the carbon assembly into which the silane-based compound penetrates; and reacting the carbon assembly with lithium metal or iodized lithium after the heat treatment.

The step of penetrating a silicon-based compound into mesopores of a carbon assembly is penetrating a silane-based compound into the mesopores of the carbon assembly, and the method for preparing a silicon-carbon composite may further include changing the silane-based compound penetrating into the mesopores of the carbon assembly to silicon by heat treating the carbon assembly into which the silane-based compound penetrates; and, after the heat treatment, changing the silicon penetrating into the heat treated carbon assembly to lithiated silicon by reacting the carbon assembly with lithium metal or iodized lithium.

The lithiated silicon may be represented by $Li_{22}Si_5$.

Hereinafter, the present application will be described in detail with reference to examples and comparative examples in order to specifically describe the present application. However, examples according to the present specification may be modified to various other forms, and the scope of the present application is not construed to be limited to the examples described above. The examples of the present application are provided in order to more completely describe the present application for those having average knowledge in the art.

EXAMPLE 1

A 100 ml a high pressure reactor made of stainless steel and equipped with a stirrer, a reflux condenser, an introduction unit and a thermostat was filled with 15 g of CMK-3 (ACS (Advanced Chemical Supplier (USA)) and 30 g of trichlorosilane. The result was mixed for 5 minutes using the stirrer, and then the stirrer was stopped. The atmospheric pressure inside the high pressure reactor was reduced to 5 torr using a vacuum pump, the vacuum line was closed, and the nitrogen line was opened to substitute the inside of the high pressure reactor with nitrogen. After that, the temperature was raised to 300° C. over 60 minutes, and the pressure inside the reactor was maintained at 130 atm for 2 hours. After that, the temperature was lowered to room temperature, 50 g of 10% sodium hydroxide was added thereto to neutralize the product, and the filtered product was dried for 24 hours at 200° C.

When measuring the surface area using a specific surface area measuring device (BET), it was identified that, as shown in FIG. 3, the surface area of the obtained product (2) was significantly reduced compared to the surface area of CMK-3 (1) prior to the immersion of the trichlorosilane, and the silicon particles were immersed into the pores. When measurements were made using a low angle x-ray diffractometer (XRD), it was reaffirmed that, as shown in FIG. 4, the silicon particles were immersed in the CMK-3 pores through the (100), (110) and (200) peak intensities corresponding to a hexagonal pore structure shown in the (i) CMK-3 being significantly reduced in the (ii) CMK-3 product into which Si was immersed. When observing the CMK-3 before and after the Si immersion using a scanning electron microscope, a, before the Si immersion, and b, after the Si immersion, were not much different as shown in FIG. 5, and it was identified that Si was present inside the pores instead of on the CMK-3 surface.

COMPARATIVE EXAMPLE 1

A Si-graphite (70:30 wt %) composite was synthesized using a ball milling process.

TEST EXAMPLE

Battery cells were formed as follows, and initial efficiency and cycle properties of Example 1 and Comparative Example 1 were compared.
  Working electrode: Si composite electrode (Example 1 or Comparative Example 1)
  Counter electrode: Li metal
  Liquid electrolyte: carbonate-based electrolyte mixed with Li salts After charge and discharge were each repeated for 100 cycles by charging/discharging the battery cells with 0.2 C/0.5 C, initial charge and discharge efficiency, and capacity retention rate (%) at the $100^{th}$ cycle compared to the initial charge and discharge efficiency were measured, and the results are shown in the following Table 1. As shown in the following Table 1, it was seen that the battery cell according to the present disclosure exhibited superior effects in improving problems in the initial efficiency and cycle property compared to the Si composite battery cell of Comparative Example 1.

TABLE 1

| | First Charge and Discharge Efficiency (%) | 25° C. State of Charge after $100^{th}$ Cycle |
|---|---|---|
| Example 1 | 85 | 95 |
| Comparative Example 1 | 65 | 50 |

The invention claimed is:

1. A silicon-carbon composite comprising:
   a carbon assembly having a plurality of carbon nanowires or carbon nanotubes assembled, and having mesopores perforated in a length direction between a plurality of the carbon nanowires or the carbon nanotubes; and
   a silicon-based material provided in the mesopores of the carbon assembly,
   wherein a percentage of the mesopores provided with the silicon-based material is greater than or equal to 20% and less than or equal to 95% based on the total mesopores of the carbon assembly.

2. The silicon-carbon composite of claim 1, wherein the carbon assembly is obtained by a plurality of the carbon nanowires or the carbon nanotubes being uniformly distributed in a hexagonal form and assembled.

3. The silicon-carbon composite of claim 1, wherein the silicon-based material includes at least one of a silane-based compound, silicon, and lithiated silicon.

4. The silicon-carbon composite of claim 1, wherein the silicon-based material is a silicon-based particle.

5. The silicon-carbon composite of claim 4, wherein a diameter of the silicon-based particle provided in the mesopores of the carbon assembly corresponds to a diameter of the mesopore of the carbon assembly.

6. The silicon-carbon composite of claim 1, wherein a diameter of the mesopore of the carbon assembly is 100 nm or less.

7. The silicon-carbon composite of claim 1, wherein the carbon assembly is a carbon assembly particle.

8. The silicon-carbon composite of claim 7, wherein a diameter of the carbon assembly particle is greater than or equal to 0.1 µm and less than or equal to 10 µm.

9. The silicon-carbon composite of claim 1, wherein a mass ratio of the carbon assembly and the silicon-based material is from 1:1 to 1:5.

10. A negative electrode comprising the silicon-carbon composite of claim 1.

11. A secondary battery comprising:
a positive electrode;
a negative electrode including the silicon-carbon composite of claim 1; and
a separator provided between the positive electrode and the negative electrode.

12. A battery module including the secondary battery of claim 11 as a unit battery.

13. A method for preparing the silicon-carbon composite of claim 1 comprising:
penetrating a silicon-based compound into mesopores of a carbon assembly having the mesopores perforated in a length direction between a plurality of carbon nanowires or carbon nanotubes by assembling a plurality of the carbon nanowires or the carbon nanotubes.

14. The method for preparing a silicon-carbon composite of claim 13, wherein the silicon-based compound penetrating into the mesopores of the carbon assembly includes at least one of a silane-based compound, silicon, and lithiated silicon.

15. The method for preparing a silicon-carbon composite of claim 13, wherein the step of penetrating the silicon-based compound into mesopores of the carbon assembly is penetrating a silane-based compound into the mesopores of the carbon assembly.

16. The method for preparing a silicon-carbon composite of claim 15, wherein the silane-based compound is silane or halogenated silane.

17. The method for preparing a silicon-carbon composite of claim 13, further comprising:
heat treating the carbon assembly into which the silicon-based compound penetrates.

18. The method for preparing a silicon-carbon composite of claim 17, further comprising:
reacting the silicon-based compound penetrating into the heat treated carbon assembly with lithium metal or iodized lithium.

19. The method for preparing a silicon-carbon composite of claim 13, wherein the step of penetrating the silicon-based compound into mesopores of the carbon assembly is penetrating a silane-based compound into the mesopores of the carbon assembly, and further comprising:
heat treating the carbon assembly into which the silane-based compound penetrates; and
reacting the carbon assembly with lithium metal or iodized lithium after the heat treatment.

* * * * *